Dec. 27, 1927.  
E. F. CHANDLER  
1,654,238  
REMOTE CONTROL APPARATUS  
Original Filed Dec. 5, 1924   3 Sheets-Sheet 1
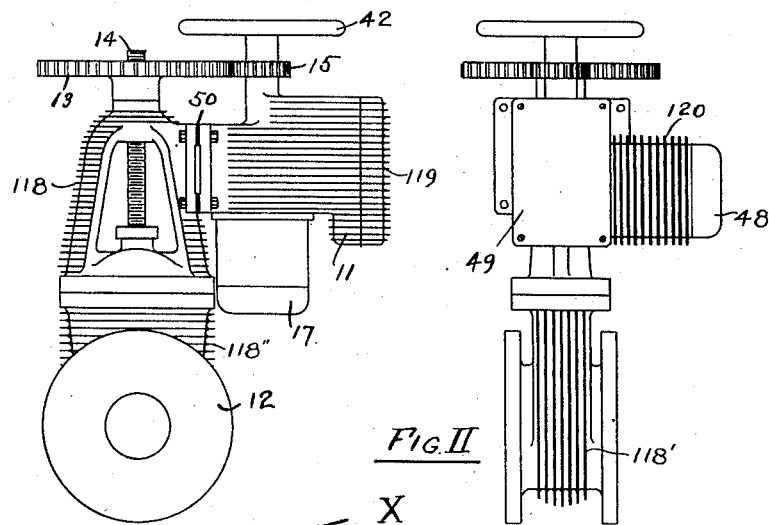
FIG. I   FIG. II
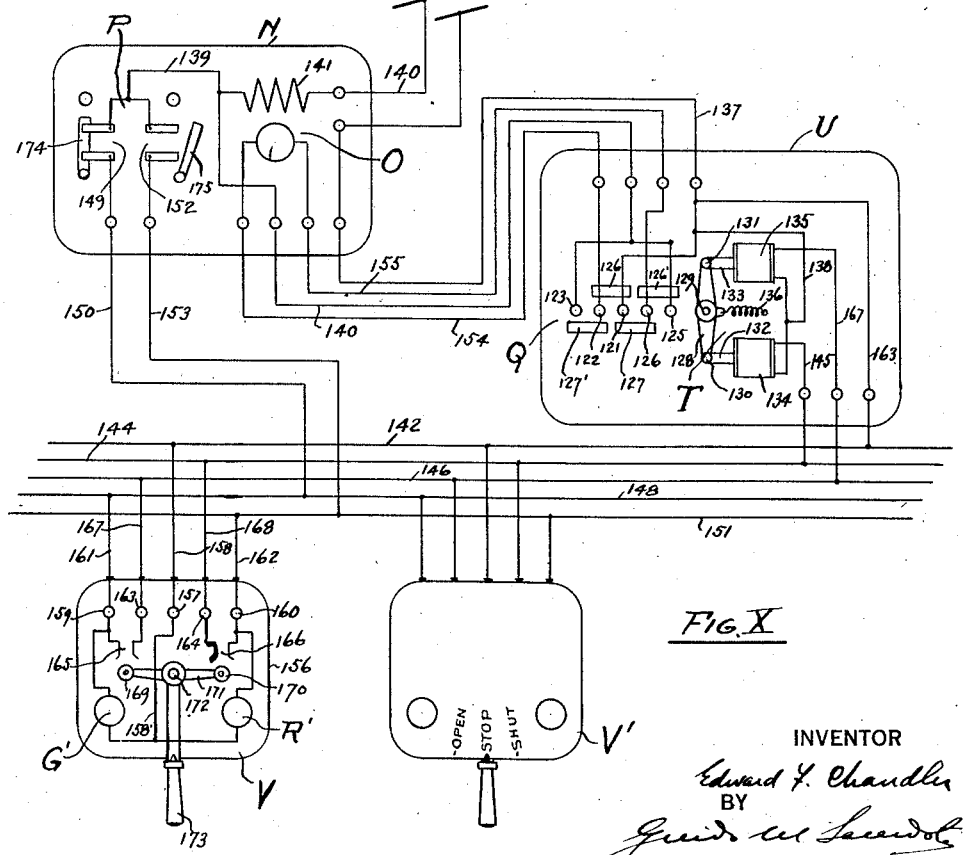
FIG. X
INVENTOR  
Edward F. Chandler  
BY  
ATTORNEY Dec. 27, 1927.  
E. F. CHANDLER  
1,654,238  
REMOTE CONTROL APPARATUS  
Original Filed Dec. 5, 1924   3 Sheets-Sheet 2
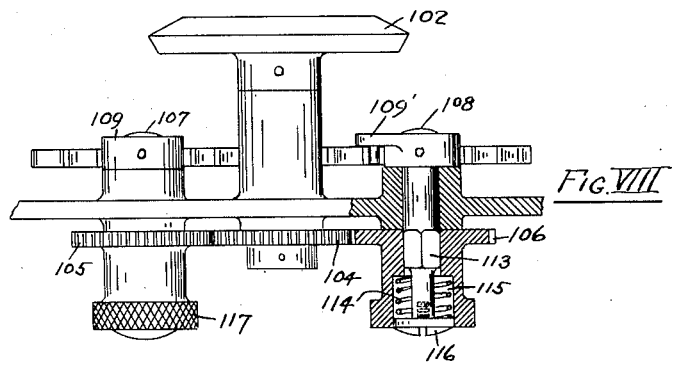
Fig. VIII
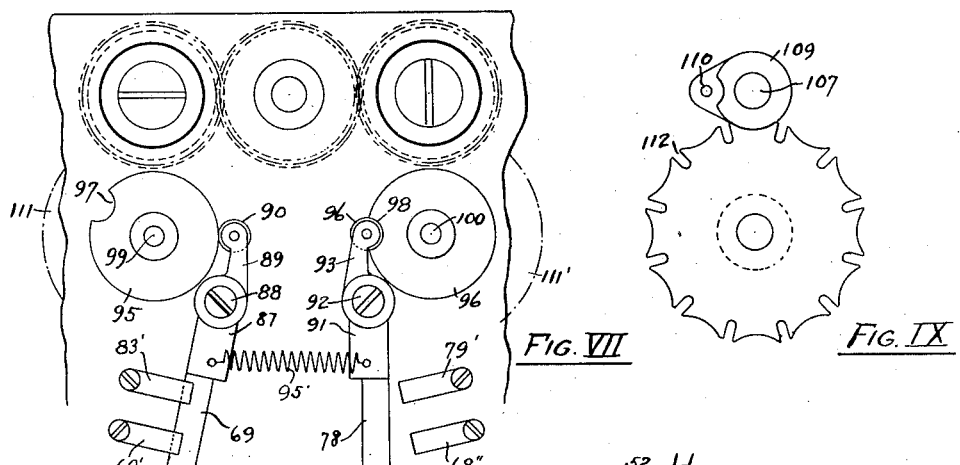
Fig. VII     Fig. IX
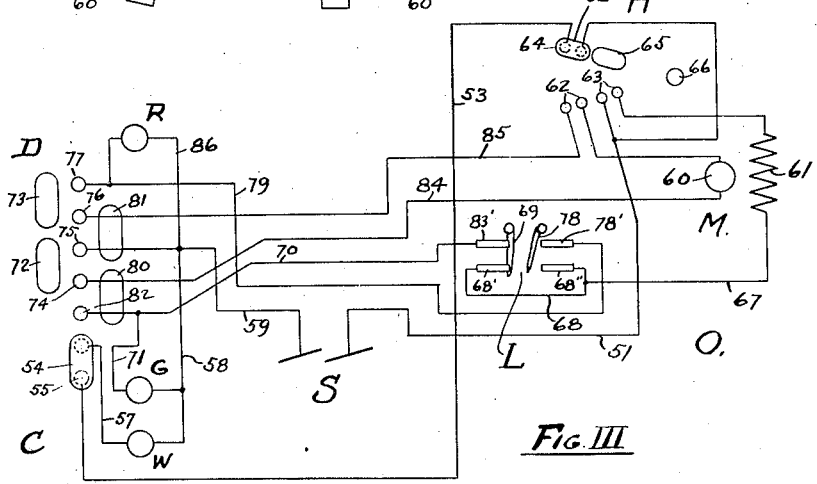
Fig. III
INVENTOR  
Edward F. Chandler  
BY  
Guido M. Saccardo  
ATTORNEY Dec. 27, 1927. 1,654,238
E. F. CHANDLER
REMOTE CONTROL APPARATUS
Original Filed Dec. 5, 1924     3 Sheets-Sheet 3
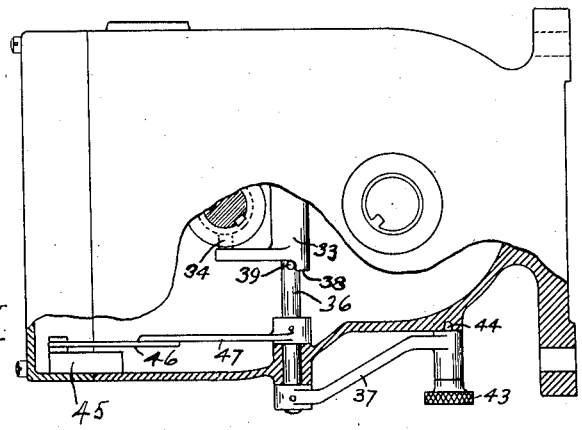
FIG. V.
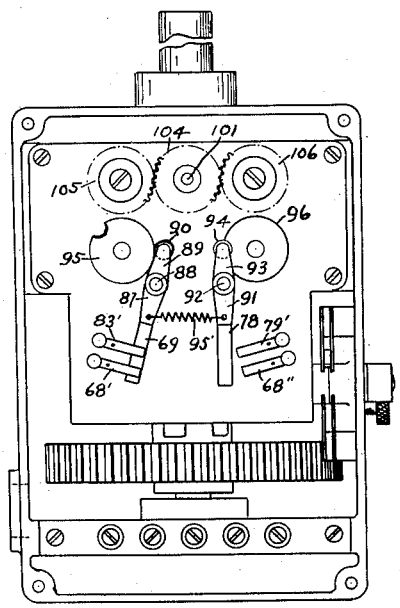
FIG. VI.
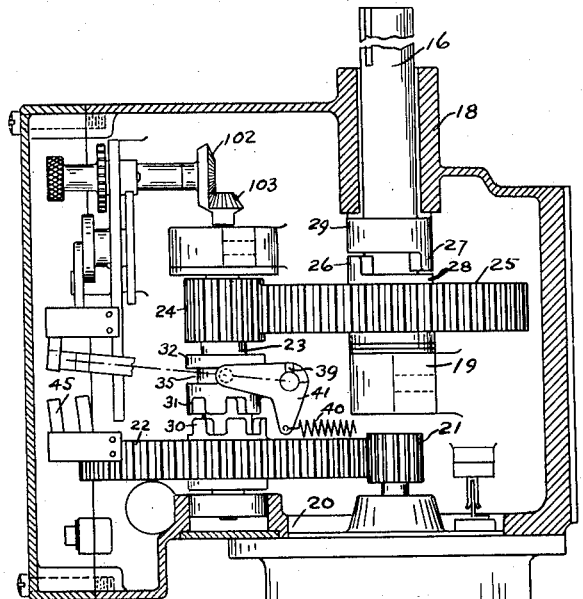
FIG. IV.
INVENTOR
Edward F. Chandler
BY
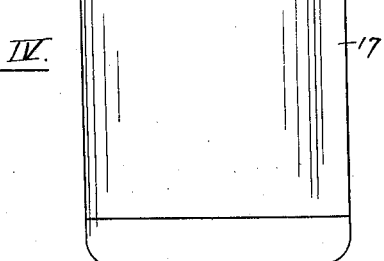
ATTORNEY Patented Dec. 27, 1927.

1,654,238

UNITED STATES PATENT OFFICE.

EDWARD F. CHANDLER, OF BROOKLYN, NEW YORK.

REMOTE-CONTROL APPARATUS.

Application filed May 14, 1927, Serial No. 192,042. Renewal of application filed December 5, 1924. Serial No. 754,014.

This invention relates to improvements in apparatus for the remote control of devices in which a predetermined amount of travel is required; and more particularly refers to apparatus for the remote control of valves and other devices in which a predetermined to-and-fro travel of the moving parts is required, such as, for instance, a bulkhead door, a railway switch or signal, a gun turret, a lock gate, and many other devices of various character.

In five previous applications for patent on remote control systems, No. 578,402, filed July 29, 1922; No. 590,854, filed September 27, 1922; No. 646,749, filed June 21, 1923; apparatus for remote control, No. 690,757, filed February 5, 1924; and limit control systems, No. 700,074, filed March 18, 1924, I have described various types of apparatus adapted for the operation of devices of the kind mentioned, and suitable for remote control from one or more stations; and I also have described electrical circuits for connecting the apparatus to the controlling station or stations, and to a source of electric supply.

The apparatus therein described, all comprise an operating unit including a reversible electric motor, and suitable driving mechanism operated thereby, together with suitable timing devices arranged to terminate the driving action when the driven member has reached the predetermined limit set for its travel; and the same also comprise various accessory devices, for the operation of signaling and safety appliances intended to assist in the general operation of the apparatus under various conditions.

In the four first mentioned applications, I have described circuits in which the controlling devices at the control station are inserted in series on the main motor circuit, with the result that the entire operating current circulates throughout the installation.

In the fifth mentioned application, and in another application for patent on methods of and apparatus for remote control, No. 676,358, filed November 22, 1923, I have described methods of controlling operating devices of the kind mentioned, entailing the employment of a secondary light duty three wire circuit, for connecting the operating devices to the controlling station or stations.

Also, in the first four mentioned applications, I have described apparatus where a set of worm gears was employed between the motor and the power take-off shaft, while in the fifth mentioned application, I have described apparatus where only spur gears or bevel gears are employed.

In this respect, the present application constitutes a continuation in part of application No. 700,074, being more particularly directed to a type of unit where for reasons which will appear in the course of this description, the use of worm gears is discarded, and preference is given to gears of the spur or bevel type, or gears, generally, where a driving element, and another element driven thereby, rotate at the same circumferential speed.

The primary object of this invention, is to provide an operating unit for the distant control of valves and the like, the construction of which represents an improvement over the types of units described and claimed in the previous patent applications, as will be fully explained in the course of this description.

Another object is to provide apparatus for the remote control of devices of the character mentioned, comprising, in combination, an operating unit of suitable design, and a limit switch governing the operation thereof, capable of much finer adjustment, and far more sensitive and reliable in its operation, than other devices heretofore in use for the same purpose.

A further object is to provide, in apparatus for the remote control of devices of the character mentioned, a novel type of driving mechanism for the limit switch employed, permitting the use of an intermediate shaft as a driving element, in place of the power take-off shaft previously used, and permitting the use of bevel gears in place of the worm gearing generally employed for this purpose.

Other objects and advantages of the present invention will more fully appear as the description proceeds, and will be set forth in the appended claims.

In the drawings:

Fig. I is a front view in elevation illustrating, in outline, the application of my controlling unit to a valve of ordinary design;

Fig. II is a side view in elevation illustrating a similar application of a controlling unit to a valve, the controlling unit being designed for bevel gear drive;

Fig. III is a diagram illustrating a typical arrangement of electric circuit for connecting the apparatus to a control station and to a source of electric supply;

Fig. IV is a front sectional view in elevation of the operating unit of the preferred type;

Fig. V is a partly sectioned plan view of the same;

Fig. VI is a side view in elevation of the apparatus, with the cover removed, showing the general arrangement of the limit switch;

Fig. VII is a fragmentary side view in elevation of the same, illustrating the limit switch on an enlarged scale;

Fig. VIII is a fragmentary plan view of the same, partly sectioned to illustrate the manner of adjustment of the limit switch;

Fig. IX is a detail view in elevation illustrating a type of Geneva gear set which may be employed in connection with the limit switch; and, Fig. X is a diagrammatic illustration of another arrangement of circuit connections, having certain advantages which will be made apparent in the course of this description.

The apparatus shown in Figs. I, IV, V, VI, consists of an operating unit comprising a casing 11, detachably secured to the valve 12, and adapted to operate the gear 13, controlling the valve stem 14, by means of a pinion 15, mounted on the power take-off shaft 16. At the lower end of said casing is mounted a reversible electric motor 17, which for manufacturing considerations is preferably coaxial with the power take-off shaft. This arrangement permits of machining the outer and inner bearings 18, 19. of the power take-off shaft, and the setting 20 for the motor, at one setting of the tool used, and this makes for economy in quantity production.

The rotation of motor 17 in one or the other direction, is transmitted to the power take-off shaft by a train of all spur gears comprising a primary set consisting of a pinion 21 mounted on the motor shaft, in mesh with a gear 22 mounted on an intermediate shaft 23, and a secondary set consisting of a pinion 24 mounted on said intermediate shaft, in mesh with a gear 25 mounted on the power take-off shaft.

Gear 25 is not keyed on shaft 16, and its rotation is transmitted to said shaft through a lost-motion type of clutch, comprising two segmental projections 26. 27, provided on the adjacent faces of hub 28 of gear 25, and enlarged portion 29 of shaft 16. The segmental form of said projections permits the gear to go through a partial rotation before the projections are brought into engagement. The motor is thus enabled to gather speed before being subjected to the load of operating the valve. This is a feature of particular importance when the valve has a tendency to "stick". The engagement of the projections 26, 27 delivers a blow to the valve whereby the same is readily loosened.

However, it is obvious that with certain types of valves, especially when of small size, and with certain types of reversible devices, no tendency to stick or to jam has to be contended with; and in such cases, the lost-motion device just described may be omitted, and the gear may be fixed on the power take-off shaft.

In a similar manner, gear 22 is not fixed on shaft 23, but is free to revolve on said shaft; the hub of said gear being provided with clutch teeth 30, adapted to inter-engage with clutch teeth 31 of a clutch sleeve 32, slidably keyed on shaft 23. Said clutch sleeve is operated by a clutch fork 33, provided with pins 34 projecting into annular groove 35 with which the clutch sleeve is formed.

Clutch fork 33 is loosely mounted on a shaft 36 mounted in and projecting through the casing, operated by means of a hand lever 37 fixed on said shaft externally to the casing. The hub of the fork is provided with a longitudinal projection 38, against which a pin 39 carried by shaft 36 will come to press when the shaft is moved in a clockwise direction. Normally, said projection 38 abuts against the pin, being held in this position by the tension of a spring 40 attached to a lug 41 integral with the clutch fork; therefore, when the sleeve interlocks with gear 22, if shaft 36 is angularly moved in a clockwise direction by means of lever 37, fork 33 will follow the movement of the shaft, and sleeve 32 will be thrown out of engagement. This is desirable, and in many cases necessary, in order to disconnect the motor from the valve, when the valve is operated manually, by means of hand wheel 42. For the purpose of retaining the parts in position for manual operation, hand lever 37 is provided with a button 43 which governs a spring operated pin 44 entering a hole in the casing of the mechanism, as shown. A similar hole (not shown), is provided for the other position of lever 37, when the parts are set for motor operation.

Counter-clockwise movement of shaft 36 from the position shown in the drawings, however, merely permits clutch fork 33 to follow this movement if not otherwise restrained, due to the action of spring 40. If, however, the relative positions of teeth 30, 31 are such that they abut each other when shaft 36 is operated, the sleeve will remain in an intermediate position with its movement only partly completed. When subsequently the gear 22 is operated by the motor through an angle sufficient to cause the disengagement of the teeth, the sleeve will snap into engaging position.

In this respect also, the mechanism can be simplified by omitting the clutch connection and by fixing gear 22 directly on shaft 23. As a result, when the valve is manually operated, the entire train of gears and the motor will be caused to revolve, but this is not objectionable in the case of small units.

When the device is set for manual operation of the valve, I also prefer to disconnect the motor from the electric circuit, so as to prevent possible interference between manual and motor operation, and also as a safety measure; inasmuch as in most instances the device is set for manual operation for the purpose of making repairs, and at such times it is well nigh necessary that motor operation be avoided. This is done by inserting a switch 45 in the motor circuit, and by attaching the switch blade 46 to a lever 47 fixed on shaft 36. When clutch sleeve 32 is disconnected, the circuit is interrupted at the switch, as Fig. IV shows, and when shaft 36 is returned to the engaging position, the circuit is re-established, even though mechanical connection may not actually have been re-established owing to the relative position of the clutch teeth.

It is obvious, that when the use of the clutch is omitted, the electrical connection may be controlled by means of any suitable switch. This precaution is of importance because the control of the device may generally be effected from a distant point, and accidents might result if the motor is inadvertently operated while the device is undergoing repairs or inspection.

Inversely, it is also obvious that when a clutch is employed controlling the mechanical connection of the valve to the motor shaft, the use of means for disconnecting the motor from the electrical circuit may be omitted.

The employment of all spur gears of the type shown in a unit type of operating mechanism is new, and quite important from various standpoints. The main advantage to be derived from this type of construction is that the device can always be depended upon to operate when needed, irrespective of whether lubrication of the various parts has been properly attended to or not. Where worm gears are employed, good lubrication is essential, inasmuch as without it the gears may become heated, the surfaces may grind, and the entire mechanism may become jammed. This implies the necessity of constant attention and frequent inspection, and it also requires the provision of means for retaining lubricating material within the casing.

I am aware that spur gears of the planetary type have been employed for a similar purpose; but in such devices as have come to my notice, transmission was effected through an internally toothed ring, maintained in position by a circumferential or crown bearing. The resulting large amount of bearing surface is conducive to considerable frictional resistance, and makes good lubrication quite as essential as in the case of worm gearings.

In my device, all the rotating elements are spindle supported; the frictional resistance developed is due to small contact surfaces, and has a very small leverage, and this insures reliable operation at all times.

In large units, it is of course possible that large speed reductions be employed, and in this case it is within the scope of my invention to use an additional intermediate shaft and set of gears, rather than using gears of too large a diameter. In other cases it may be desirable to set the motor at one side of the casing, as shown in Fig. II, where 48 designates a motor attached at one side of the casing 49. In this case it may be readily understood that the set of spur gears 21, 22, may be substituted by a set of bevel gears, as shown in Fig. VIII of application No. 700,074.

As far as frictional and lubrication conditions are concerned, bevel gears, spindle supported, may be considered the equivalent of the spur gears previously described.

Other advantages due to the use of spindle supported bevel or spur gears, are their low machining cost, no necessity of using costly materials, such as brass or bronze, long life, and simplicity in assembling and in machining casing. Another advantage, already pointed out, is that while lubrication is needed or desirable for the various bearings, there is no necessity, such as existing in connection with worm gears, of having the gears themselves running in oil; furthermore there is no necessity of such abundant lubrication and constant supervision as needed when a large frictional resistance has a chance to develop.

When the device is applied to valves in a steam line, or wherever parts are likely to become heated, it is advisable to insert an insulating pad between the valve and the unit, as shown at 50 in Fig. I. This will act as a protection for the insulation of the motor and of the electrical connection.

The chief difficulty entailed by the use of ordinary bevel or spur gears in devices of this kind, is due to the necessity of providing a reliable and sensitive system of control of the operation of the mechanism. It is essential, for valves and other devices, that full operation thereof be provided for; and it is equally essential that undue jamming or strain on the moving and other parts of the apparatus be prevented.

In my previous applications, I have described various mechanical and electrical appliances, which may go under the general denomination of limit switches, for terminating the operation of the device as the end of the travel of the moving member is reached, one way or the other.

These appliances generally include mechanically controlled electric switches, the function of which is to cut off the supply of current to the motor at the proper time, or to otherwise stop the operation; the same are generally adjustable for proper timing, and are operated by the power take-off shaft, or by some other member permanently connected with the valve or other device operated.

The mechanical control of the electric switches proper, is generally achieved by means of members capable of limited, adjustable travel in one or the other direction, connected by a high ratio gearing to the take-off or drive shaft. The worm and traveling nut commonly used is a good example. If, for instance, 100 turns of the drive shaft are required to open or close a valve, while these turns are being made, the nut travels a certain distance, at a slow rate, and gradually moves into the tripping position to throw the switch. By resorting to a trigger actuated switch, a small movement of the nut is sufficient to effect the release but there is a delay on the reverse, while cocking or resetting the mechanism.

At any rate, such mechanisms as have heretofore been used, comprise a member which is slowly but continuously traveling from one extreme to the other, while the device is operated in one or the other direction. The travel of this member is necessarily limited, while to operate the device quite a number of revolutions may be required.

In practice, however, these devices must be of sturdy and reliable construction, the switches must be thrown a sufficient distance, and no reliance can be placed on infinitesimal movements of controlling parts. Due consideration must also be given to frictional wear which in time is likely to occur. For these reasons, fine adjustment is out of the question, and as a general rule reliance cannot be placed entirely on the limit switch mechanism, but auxiliary appliances to stop operation at the proper time must be employed.

To make this point quite clear, let us imagine a limit switch control of a shaft which must be stopped after rotating say for 100 revolutions, assuming that the member controlling the switch travels in the meantime a distance of six inches in a longitudinal or a circumferential direction. For each revolution of the shaft, this traveling member moves about $\tfrac{1}{16}''$, and this means that in these conditions if the shaft must be stopped within one revolution, we only have $\tfrac{1}{16}''$ travel of the controlling member at our disposal, to effect the operation of the switch. It is obvious that in practice this movement is too small, and yet this is the condition obtaining in limit switches heretofore in use.

The extent of the travel of the controlling member from one extreme to the other has no bearing on the operation of the switch; its limitations are in reality due to consideration of design, and to the necessity of making compact devices occupying a relatively small space. But the amount of travel of the controlling member actually employed in causing the operation of the switch is of vital importance, and it is highly desirable that a substantial distance of travel be thus employed.

This condition may be fulfilled in several ways. The controlling member may be a cylinder with a spiral groove on its surface, and either this cylinder, or a switch throwing member engaging its groove may have a slow axial motion while the cylinder is caused to rotate. In this case the length of travel of the switch controlling member is in reality represented by the length of the spiral groove from one extreme to the other. If the cylinder is two inches in diameter, with a pitch of $\tfrac{1}{8}''$ for the spiral groove, and three inches in length, the total length of its twenty-four turns of the spiral will be about 150 inches; therefore a useful space of one and a half inches may be had for the control of the switch within one revolution of a shaft making a total of one hundred revolutions. This corresponds to multiplying the travel of the controlling member, in this case the travel being represented not by the axial movement, but by the spiral groove traveling in relation to the switch throwing member, after the fashion of a groove in a dictaphone cylinder.

Another satisfactory solution of this problem lies in the adoption of a step by step motion for the controlling member, in place of a continuous motion. For a total actual travel which is comparatively limited, this permits elementary intermittent motions of a substantial amplitude when considered individually; so that any one step provides sufficient length of contact between the controlling and the controlled member, to satisfactorily fulfil the requirements of actual practice.

This is the principle adopted in connection with the limit switch illustrated in the drawings. Before explaining its operation in detail I will, for the sake of clarity, explain the general operation of the system, by referring to the diagram in Fig. III.

The system illustrated comprises an operating mechanism O and a controlling mechanism C, the former being in the form of a unit detachably secured to the valve or other device to be operated, and the latter being preferably also in the form of a self-contained structure, which may be mounted in a convenient location remote from the valve, as for example on the switchboard of a power plant. Suitable operating and control wires connect the controller with the mechanism and with a source of electric supply, S.

The operating mechanism is shown as consisting of a motor M for operating the valve, a limit switch L for automatically de-energizing the motor when the valve reaches either limit of its stroke, and a hand operated mechanism H for at times dissociating the power operating mechanism from the valve and rendering the valve capable of manual operation.

The controller C comprises signal lamps G and R for indicating, respectively, that the valve is in open or closed position, a signal lamp W for indicating that the valve is under manual control, and a drum controller D operable by hand for controlling the operation of the valve.

The various parts are illustrated in the relative positions which they occupy when the valve is in one of its extreme positions, say the open position, and the mechanism H is set for manual operation. The signal lamp W (which may be white in color), is energized by current flowing from line through wire 51, a switch 52 of mechanism H, wire 53, contact bar 54 of the controller (which is in its neutral positon) bridging contact points 55, 56, the lamp circuit 57 and wires 58, 59 back to the line. Should the drum controller be inadvertently operated one way or the other while lamp W is thus energized, nothing will occur, except the de-energizing of lamp W, because no current can pass through the armature 60 or the field 61 of the motor, these circuits being interrupted at 62, 63. If the controller is now released, it may automatically return to its neutral positon by any well known means, not shown.

If the mechanism H is now set for motor operation, by angularly moving the lever carrying the contact bars 64, 65, around its pivot 66, to a point where said contact bars will respectively close switches 62, 63, the circuit of lamp W will become interrupted, and lamp G (which may be green in color) will become energized by current flowing from line through wire 51, switch 63, field 61, wires 67, 68, contact bar 69 of the limit switch L, wire 70, the lamp circuit 71, and through wires 58, 59, back to the line.

If the drum of the controller is now moved to the right, causing its contact bars 72, 73, to bridge contact points 74, 75 and 76, 77, respectively, no current will pass through the field 61, because contact bar 78 of limit switch L is in its open position; said bar controlling the circuit of wire 79, leading from contact point 77 to the limit switch. The controller will therefore automatically return to neutral.

If the controller drum is moved towards the left, causing its contact bars 80, 81 to bridge contact points 82, 74 and 75, 76 respectively, current will flow from line through wire 51, contact bar 65, field 61, wires 67, 68, contact bar 69, wire 70, contact bar 80, wire 84, motor armature 60, contact bar 64, wire 85, contact bar 81 and wire 59 back to the line. It will be observed that the circuit of the green lamp remains closed, so that this light continues to burn. The current in the circuit just traced causes the operation of the motor so that the valve is moved by means of the mechanism heretofore described to the closed position. As soon as the operation is commenced, however, the limit switch L is operated to close contact bar 78, so that the circuit for signal lamp R (which may be red in color) is completed through wire 79, lamp circuit 86 and wire 59, thus causing this lamp to glow.

The response of the valve to the operation of the controller is thus indicated at the controller by the energization of both of the signal lamps. At the completion of the stroke, the limit switch is opened at contact 69, so that the green lamp is extinguished and motor M is de-energized by the opening of the field circuit. Only the red lamp of the controller is now illuminated, thus indicating to the attendant that the valve is in the closed position.

The operation of the valve to the open position may now be effected by moving the controller drum to the right, closing the circuit through contact bars 72, 73, as previously explained; contact bar 78 of the limit switch being now in the closed position, the circuit is operative, and current will flow through the armature in a reverse direction, accordingly causing the rotation of the motor and of the operating mechanism to take place in a reverse direction, to open the valve.

Contact bar 69 is closed automatically immediately upon the beginning of the stroke of the valve, so that both lamps are again energized to indicate that the valve is responding to the controller. At the end of the stroke the contact bar 78 of the limit switch is re-opened and thus effects the de-energization of the red signal lamp, so that the parts are returned to the positions illustrated in Fig. III, with the exception of the manual control mechanism H.

It is customary, in devices of this kind, to provide means counteracting the momentum of the moving parts to effect a quick termination of their movement after the circuit has been de-energized, in order to prevent jamming of the moving parts of the valve. In some cases, on the other hand, braking means or their equivalent are purposely omitted and the momentum of the moving parts is utilized to tighten the valve on its seat, to effect a tight closure. This is done especially when the limit switch employed is not sensitive enough to permit interruption of the current to occur at the exact moment when the valve reaches its seat, so that to prevent jamming or damage to the moving parts power is cut off at a little earlier time and the additional fractional movement needed is obtained by the flywheel effect of the motor armature and the valve gear.

In the present instance, no dynamic or other braking means are shown, because the extremely fine adjustment made possible by the type of limit switch employed permits of cutting off the current at the exact moment when the valve has completed its travel. In small units the momentum of the moving parts is rather limited, and the frictional resistance created is usually sufficient to stop the operation as soon as the supply of current is discontinued, so that complete regulation is effected solely by means of the limit switch.

In many instances, however, especially in connection with larger units, the employment of braking means may be desirable, or even necessary; and in these cases suitable arrangements may be adopted by providing mechanical or electrical, or electro-mechanical means, such, for instance, as described in my co-pending applications previously mentioned.

I will now proceed to describe in detail the construction and operation of my improved limit switch, by referring to Figs. IV, VI, VII, VIII, IX.

The same comprises terminals 83', 68', which may be bridged by contact bar 69, and terminals 68', 79', which can be bridged by contact bar 78, these various parts corresponding to those indicated by the same reference characters in Fig. III. Contact bar 69 is carried by a lever 87, preferably insulated therefrom, pivotally mounted at 88, and provided with an arm 89, carrying a roller 90. In a similar manner, contact bar 78 is carried by a lever 91, pivotally mounted at 92, provided with an arm 93 carrying a roller 94. A spring 95, connecting the two levers, tends to maintain both contact bars in the open position; however, rollers 90, 94, respectively bear against the peripherical surface of two notched discs 95, 96, which normally force the levers to the closed position, allowing spring 95 to detach one or the other contact bar only when notches 97, 98 with which discs 95, 96 are respectively provided, register with rollers 90, 94. The rotation or angular motion of discs 95, 96, which are respectively carried by shafts 99, 100, thus controls the operation of the contact bars.

It has been explained how, at the beginning of the operation, one of the contact bars, for instance 69, being closed, its corresponding signal lamp is energized, indicating that the controller drum may be moved towards the left, causing the motor circuit to be completed through contact bars 80, 81. The fact has also been mentioned that as soon as the operation is started, the other contact bar 78 is also closed, energizing its signal lamp, and indicating that operation of the valve is under way.

To bring about this result, shafts 99, 100, are associated with and controlled by the operating mechanism, being connected thereto by a suitable train of gears. This is made apparent in Fig. IV, where it is seen that a shaft 101, carrying a bevel gear 102, is operated by a pinion 103 in mesh with said gear carried by intermediate shaft 23.

The rotation of shaft 23 in one or the other direction is thus transmitted to shaft 101. This shaft also carries a gear 104, driving two gear wheels 105, 106, respectively mounted on shafts 107, 108, and respectively controlling the operation of discs 95, 96. To this end, shafts 107, 108, each carry an arm 109, 109', provided with a pin 110, 110', (not shown), adapted to engage and to operate Geneva wheels 111, 111', mounted on shafts 99, 100, respectively.

The operation of the Geneva movement thus obtained is well known. Each wheel is provided with a number of radial slots 112, one of which is engaged by the pin at each revolution of the arm, so that a 360 deg. movement of the arm corresponds to a relatively small angular motion of the wheel, and continuous motion of the arm is transformed into intermittent motion of the wheel. In the case illustrated, where the wheels are each provided with twelve radial slots, twelve revolutions of shafts 107 or 108 are necessary in order to produce a complete revolution of the corresponding wheels. However, while a considerable speed reduction is thus obtained, the elementary motions of the wheels in reality take place at a fairly high angular speed, so that a substantial angular travel of the discs 95, 96, is produced at each step.

In the case illustrated, assuming that the ratio of gears 103, 102 is 1:2, and assuming the ratio between gear 104 and gears 105, 106 to be 1:1, it is obvious that two revolutions of shaft 23 will cause one revolution of shafts 107, 108, and one-twelfth of a revolution of wheels 111, 111'. If the ratio between pinion 24 and gear 25 is 1:3, two thirds of a revolution of gear 25 will cause one revolution of shafts 107, 108; and if the ratio between pinion 15 and gear 13 is 1:4, one sixth of a revolution of the valve gear 13 will be sufficient to produce the same result.

On the other hand, owing to the construction illustrated, one-twelfth of a revolution of discs 95, 96, is sufficient to throw rollers 90, 94, in or out of engagement with notches 97, 98, opening or closing their corresponding contact bars. It is obvious therefore, that if the switch is properly adjusted to the operation of the valve, the termination of the operation may be controlled within a very small angular travel of the valve gear.

In practice, the Geneva wheels used are generally provided with a much greater number of slots, and a smaller gear ratio is used between the valve gear and the Geneva wheels; so that while regulation is still maintained within one revolution of the valve gear or less, the said gear may rotate a sufficient number of revolutions to operate the valve one way or the other, and still cause less than one complete revolution of the discs 95, 96.

When the necessary number of revolutions of the valve gear or shaft is very large, the system may be applied with suitable modifications by means of a series of Geneva movements, or other equivalent mechanical expedients, causing a great relative reduction of speed, by causing step by step angular motion of the elements ultimately controlling the contact bars; each step causing a substantial amount of surface contact between the controlling and the controlled members. Devices of this kind form the subject of a separate development which is not an integral part of the present invention, and which is not, therefore, illustrated in greater detail.

The limit gear can be easily adjusted to conditions such as may occur within a wide range of devices to be operated. To this end, the relative position of the various parts is made adjustable in a manner similar to that described in connection with other types of limit gears used in devices illustrated in some of my previous applications.

Gears 105, 106, are slidably keyed on their respective shafts, or else the shafts are formed with a square shank portion 113, on which the gears are slidably invested. Each gear is normally maintained in position of inter-engagement with gear 104 by the action of a spring such as shown at 114, said spring being housed in a cavity 115 within the hub of the gear, and being maintained under pressure by the head of a retaining screw 116. It is thus possible to adjust the angular position of shaft 107 or 108 in relation to gear 104, by pulling the relative gears 105 or 106 out of engagement with said gear 104 by means of knob 117, against the action of spring 114, then by turning the gear of the desired angle, and then by releasing the gear in its new position of inter-engagement with gear 104.

In practice the mechanism is adjusted by shutting the valve, and adjusting the disc controlling the closing operation until the roller drops into the notch, then by opening the valve and repeating the operation for the other disc. Depending upon the number of teeth in gears 105, 106, the setting may be made for a small fraction of one revolution, as will be noted.

A limit gear of the kind described, has the great advantage of permitting an exact control of the valve movement, at the same time providing a sturdy and reliable construction, the operation of which is not likely to be affected by frictional wear to any perceptible extent. In addition to this, it also has the advantage of being extremely sensitive, inasmuch as, when one of the contact bars is open, it will be reset in its closed position inside of one revolution of its corresponding shaft 107, 108. This may be very important in cases of emergency, where the valve having been started in one direction, it should become necessary to immediately reverse it, for throttling or other purposes.

It has been mentioned before, that in high temperature steam lines, where the valve is apt to become highly heated, it is desirable to protect the unit against damage from this cause, and that I accomplish this by the insertion of a suitable heat insulating pad between the valve and the unit. This is of considerable importance, and constitutes an additional and new method of protection of the device.

Obviously, however, where the unit is subject to high temperatures over very long periods, there is a temperature rise due to slow radiation or radiation at a rate less than the rate of temperature rise. In these cases I have found that a relatively low temperature may be maintained for both the valve parts and the control unit, by providing them with suitable heat radiating fins which may be similar to those used on air cooled internal combustion engine cylinders, and such as shown at 118, 119, 120, in Figs. I and II. As a result, circulation of the surrounding air is established, which aids in the cooling effect.

In Fig. X I illustrate another system of connections where the reversal of the current is effected by means of an electro-magnetically controlled switch which may be mounted in a unit separate and independent from the operating mechanism unit, and where the limit switch is not in series with the main circuit, but is inserted on a controlling shunt line.

The system comprises an operating unit N, including a motor O and a limit switch P; a reversing switch Q governed by an electro-magnetic control T, preferably mounted in a separate unit U; one or more controlling stations V, V' for the remote control of the apparatus; and electrical connections linking these various elements together and to a source of electric supply X.

The reversing switch comprises a central terminal or contact point 121, two additional terminals or contact points 122, 123 at one side thereof, two more terminals or contact points 124, 125 at the other side, and a contact member carrying two sets of contact bars 126, 126', and 127, 127', adapted to bridge the central terminal with one adjoining, and the two terminals at the opposite side when moved in one direction, or bridging the central terminal with the one adjoining at the opposite side, and the two terminals at the other side. Thus it will be seen that if the controlling or contact member is moved downward, contact bar 126 will bridge terminals 121, 122, and contact bar 126', will bridge terminals 124, 125 at the opposite side; and if the contact member is moved upwardly, contact bar 127 will bridge terminals 121, 124, and contact bar 127' will bridge terminals 122, 123.

The operation of the contact member is governed by a beam 128, pivotally mounted at 129 at a point intermediate between its two ends 130, 131, each connected to an electro-magnet floating core 132, 133. Owing to the well known action of solenoids, when solenoid 134, surrounding core 132, is energized, it will draw said core inwardly, causing angular motion of the beam in a counter-clockwise direction. In a similar manner, if solenoid 135 is energized, core 133 will cause angular movement of the beam in a clockwise direction. A tension spring 136 attached to the beam, normally holds the beam and the cores at a neutral or intermediate position. Suitable structure may be built reproducing the conditions shown in the diagram, whereby angular motion of the beam in one direction, say the counter-clockwise direction, will cause downward movement of the contact member, while angular motion of the beam in a clockwise direction will cause movement of the contact member in the opposite direction.

The arrangement is such that if one solenoid is energized, attracting its corresponding core inwardly, the core at the opposite end of the beam will move away from its solenoid; so that subsequent energization of the other solenoid will be powerless to attract its corresponding core, its attracting force being more than counterbalanced by the holding power of the solenoid which is at the time operative. On the other hand, as soon as the operative solenoid is deenergized, the core is released, and the beam will return to the neutral position shown in the diagram, owing to the action of spring 136.

The solenoids are connected at one end in parallel to a return wire 137 leading from line to central terminal 121 of the reversing switch, by a wire 138, and at the other end are each individually connectible to one of the contact bars of the limit switch by the operation of the control station, as I will presently explain. In a similar manner one of the two terminals of each of the two elementary switches composing the limit switch are connected in parallel to the other end of the line by a wire 139, leading to wire 140, in which is inserted in series field coil 141, and which also connects in parallel the two extreme terminals 123, 125, of the reversing switch. The remaining terminals of the said two elementary switches are each individually connectible to one of the said solenoids through the operation of the control station, as stated.

To this end I employ a five wire circuit comprising a return wire 142 connected to line by wires 143, 137; a wire 144 connected to the free end 145 of solenoid 134; a wire 146 connected to the free end 147 of solenoid 135; a wire 148 connected by wire 150 to the free end of switch 149 of the limit switch; and a wire 151 connected to the free end of switch 152 of the limit switch by wire 153.

The main circuit is completed by connecting one pole of the motor armature to one of the intermediate terminals 122 of the reversing switch by means of a wire 154, and the other pole to the other intermediate terminal 124 by means of the wire 155.

The controlling circuit, or each controlling circuit if more than one is used, connects the five wire circuit to the controlling station. The controlling station comprises a panel 156, provided with a central terminal 157 connected to wire 142 by wire 158, and connected in parallel to the circuits of two signal lamps G', R', by wire 158'. Said panel is furthermore provided with two end terminals 159, 160, respectively connecting wires 148, 151 to lamps G', R', by means of wires 161, 162, and with two intermediate terminals 163, 164, respectively connecting one of the poles of switches 165, 166 to wires 146, 144, by means of wires 167, 168. The other pole of said switches is connected, respectively, to wires 161, 162, and therefore to wires 148, 151.

One or the other of the said two switches may be made operative by bridging its contact poles by means of a contact member 169 or 170, mounted at the two ends of a beam-like controlling member 171, pivotally mounted at an intermediate point 172, and operated by a hand lever 173. As the outline of control station V' shows, the cover of the panel permits the two lamps to show through, and bears indications of the central or neutral position of the hand lever, corresponding to both switches 165, 166, open, and its two operating positions, one at each side, corresponding to one or the other of said switches being operative, and corresponding to control of the operating mechanism in one or the other direction.

Assuming that the contact bar 174 of switch 149 of the limit switch is in its closed position, and that contact bar 175 of switch 152 is open, as represented, both the reversing switch and the control lever being in their neutral position, we will now examine the result of the operation of the control lever.

If the control lever is moved to the left, causing angular motion of beam 171 in a clockwise direction, and consequent bridging of the contacts of switch 165, current will flow from line through wires 140, 139, switch 149, wire 150, wire 148, wire 161, switch 165, wire 167, wire 146, wire 147, solenoid 135, wire 138, and wire 137 back to the line. Before the operation of the lever, current was flowing through the same circuit, but not through switch 165, which was open, but only through the circuit of lamp G', indicating the position of the valve (open). The operation of lever 173 does not disturb the lamp circuit, and this lamp will continue to glow; but the current passing through switch 165 will cause the energization of solenoid 135, attracting core 133, and causing the motor circuit to become closed by means of contact bars 127, 127', of the reversing switch.

Current will therefore now also flow from line through wire 140 and field 141, contact bar 127', wire 154, the motor armature, wire 155, contact bar 127, and back to line through wire 137; the circuit of the limit switch, control station, and solenoids becoming in effect a secondary circuit shunted from the main operating current.

It has been explained that when the controller is in its neutral position, and one of the contact bars of the limit switch is in its closed position, current will continue to flow through one or the other of the signal lamps; it may here be added, that the resistance of the lamps is such as to permit the passage of a very small current, so that other elements in the circuit such as the motor in the former case, or the solenoid in the present case, will not be energized.

The motor having thus been started in one direction, driving the operating mechanism, contact bar 175 of the limit switch will immediately snap into its closed position, closing the circuit of lamp R' through wires 153, 151, 162, 158'. Said lamp will therefore begin to glow, together with the other lamp, indicating the response of the mechanism to the controller. At the end of the stroke of the valve, the limit switch will be operated to disconnect contact bar 174, thereby interrupting the circuit of lamp G' and solenoid 135, causing the de-energization of both lamp and solenoid.

The action of spring 136 will therefore return the reversing switch to normal, interrupting the motor circuit, and the only circuit left in operation will be that of lamp R', indicating the other (shut) position of the valve.

Lever 173 may then be returned to neutral by hand or by any suitable means. If the lever is now operated in the opposite direction, the bridging of the contacts of switch 166 will bring about the energization of solenoid 134, through current flowing through contact bar 175 of the limit switch; the reversing switch will be operated so as to close the motor circuit through contact bars 126, 126', and current will flow through the motor armature in the opposite direction, causing reverse operation of the operating mechanism.

If, on the other hand, lever 173 is thrown to the right while the circuit is in the condition represented, the lamp G' being glowing, and the lamp R' being extinguished, no operation will take place; because contact bar 175 of the limit switch being in its open position, does not permit passage of current through switch 166, even though its contacts are bridged by contact member 170.

One of the advantages of this type of circuit resides in the fact that the limit switch does not control the main or operating circuit, but only controls a secondary circuit where only a small amount of current is allowed to pass. The parts composing the limit switch may therefore be relatively small, and in keeping with the limited space generally allotted for this part of the mechanism.

Another advantage is the possibility of mounting the reversing switch as a separate unit. This simplifies the design of the unit, which should be as small and light and compact as possible, in view of the limited space sometimes available for valve installations. It relieves the designer of the necessity of making provisions against arcing which may occur when the operating current is interrupted; and it permits the use of standard design switches, which may be found on the market, and which can be installed wherever convenient.

No means for setting the device for manual control, and corresponding signal means, are shown in the diagram; it is obvious, however, that suitable appliances may be inserted, whenever desired.

The same remark applies to braking means of a mechanical, or electrical, or electro-mechanical character; it may here be stated, however, that dynamic braking may be conveniently applied with this system.

Owing to the solenoid control of the reversing switch illustrated, there is no possibility of interference between various controlling stations. Assuming that one station is operated, starting the mechanism in one direction, the operation of another station to set in reverse will have no effect on the reversing switch; because the solenoid which was formerly energized prevails in its action on beam 128.

The operation, however, can be immediately reversed by throwing the lever at the controlling station originally operated to its other extreme position.

When a plurality of controlling stations are used, however, safety considerations make it advisable that automatic means be provided for the automatic return to neutral of the operating levers. Otherwise, if by chance the lever at one station should be thrown at its extreme position temporarily inoperative, and the lever at another station should be operated to the operative position, as soon as the operation of the valve has ceased, and the reversing switch has returned to neutral, the solenoid now energized would immediately start the motor again in the opposite direction; possible interference of this kind is therefore to be avoided.

From the foregoing it appears that I provide a valve controlling mechanism of the unit type, where compactness and reliable operation are achieved with relatively simple means. One of the characteristics of my invention is the transmission of power from the driving to the take-off shaft by employing spur or bevel gears so mounted that lubrication, while desirable, is not absolutely essential.

Another important feature is the use, in combination with an operating mechanism of the character described, of a finely adjustable, highly sensitive, and sturdily constructed limit gear, assuring a reliable control of the device at all times, to a certain extent responsible for the possibility of employing spur or bevel gears, owing to the possibility of driving the limit gear mechanism by means of an element rotating at a relatively high speed.

The drawings are intended for illustrative purposes only, and not in a limiting sense, and it is understood that the apparatus shown may be modified in its details to suit various conditions, without departing from the scope and spirit of the appended claims.

I claim:

1. In an operating unit of the class described, a motor attached thereto, a power take-off shaft, limit means controlling the operation of said motor, mechanism within said casing for operatively associating said motor with said shaft, said mechanism comprising sets of gears, all of which are composed of elements rotating at the same circumferential speed for each set, and a set of gears also composed of elements rotating at the same circumferential speed, driving said limit means.

2. In an operating unit of the class described, a casing, a motor attached thereto, a countershaft, a power take-off shaft, limit means controlling the operation of said motor, a speed reducing gearing connecting said motor to said countershaft and a speed reducing gearing connecting said countershaft to said power take-off shaft, each gearing being composed of elements rotating at the same circumferential speed, and a set of gears also composed of elements rotating at the same circumferential speed, driving said limit means.

3. In an operating unit of the class described, a casing, a motor attached thereto, a countershaft, a power take-off shaft, limit means controlling the operation of said motor, a speed reducing gearing connecting said motor to said countershaft and a speed reducing gearing connecting said countershaft to said power take-off shaft, each gearing being composed of elements rotating at the same circumferential speed, and a set of gears also composed of elements rotating at the same circumferential speed, operatively associating said limit means to said countershaft.

4. In an operating unit of the class described, a casing, a motor attached thereto, a power take-off shaft and a countershaft mounted in said casing in directions parallel to the axis of said motor, a pinion and gear set connecting said motor to said countershaft, a pinion and gear set connecting said countershaft to said power take-off shaft, limit means controlling the operation of said motor, and a set of gears composed of elements rotating at the same circumferential speed, driving said limit means.

5. In an operating unit of the class described, a casing, a motor attached thereto, a power take-off shaft and a countershaft mounted in said casing in directions parallel to the axis of said motor, a pinion and gear set connecting said countershaft to said power take-off shaft, a pinion and gear set connecting said motor to said countershaft, limit means controlling the operation of said motor, and means operatively associating said limit means to said countershaft.

6. In an operating unit of the class described, a casing, a motor attached thereto, a power take-off shaft and a countershaft mounted in said casing in directions parallel to the axis of said motor, a gear loosely mounted on said countershaft, a pinion carried by said motor in mesh therewith, a gear loosely mounted on said power take-off shaft, a pinion carried by said countershaft in mesh therewith, a clutch device adapted to connect said first mentioned gear to or to disconnect it from said countershaft, a lost motion device for transmitting motion from said second mentioned gear to said power take-off shaft, limit means controlling the operation of said motor, and means operatively associating said limit means with said countershaft.

7. In an operating unit of the class described, a casing, a motor attached thereto, a power take-off shaft mounted in said casing, co-axial with said motor, a countershaft also mounted in said casing, parallel to said take-off shaft, a gear loosely mounted on said countershaft, a pinion carried by said motor in mesh therewith, a gear loosely mounted on said power take-off shaft, a pinion carried by said countershaft in mesh therewith, a clutch device adapted to connect said first mentioned gear to or to disconnect it from said countershaft, a lost motion device for transmitting motion from said second mentioned gear to said power take-off shaft, limit means controlling the operation of said motor, and a set of bevel gears operatively associating said limit means with said countershaft.

8. In a device of the class described, the combination, with a motor and an operating mechanism comprising a power take-off shaft, of limit means controlling the operation of said motor, comprising contact means, means governing the operation of said contact means, and means operatively associated with said mechanism, causing a step by step motion of said governing means.

9. In a device of the class described, the combination, with a motor and an operating mechanism comprising a power take-off shaft and means operatively associating said motor with said take-off shaft, of limit means controlling the operation of the device, said limit means comprising a controlling member, means governing the operation of said controlling member, and means operatively associated with said mechanism, causing a step by step motion of said governing means.

10. In a device of the class described, the combination, with a motor and an operating mechanism comprising a power take-off shaft, and means operatively associating said motor with said take-off shaft, of limit means controlling the operation of the device, said limit means comprising controlling means, means governing the operation of said cotnrolling means, and a Geneva gearing operatively associated with said mechanism, causing intermittent motion of said governing means.

11. In a device of the class described, the combination, with a motor, a power take-off shaft, a mechanism operatively associating said motor with said take-off shaft comprising a countershaft, and limit means controlling the operation of the device, of a set of gears composed of elements rotating at the same circumferential speed, connecting said countershaft to said limit means.

12. In a device of the class described, the combination, with a motor and an operating mechanism comprising a power take-off shaft and means operatively associating said motor with said take-off shaft, of limit means controlling the operation of said motor, comprising contact means, means governing the operation of said contact means, and adjustable means operatively associated with said mechanism, causing a step by step motion of said governing means.

13. In a device of the class described, the combination with a motor and an operating mechanism comprising a power take-off shaft and means operatively associating said motor with said take-off, shaft of limit means controlling the operation of said motor comprising contact means, means governing the operation of said contact means, a member associated with said operating mechanism, receiving continuous motion therefrom, while said mechanism is operative and means interposed between said member and said governing means, transforming the continuous motion of said member into a step by step motion of said governing means.

14. In a device of the class described, the combination, with a motor and an operating mechanism comprising a power take-off shaft and means operatively associating said motor with said take-off shaft, of limit means controlling the operation of the device, said limit means comprising controlling means, means governing the operation of said controlling means, a Geneva gearing comprising an actuating member operatively associated with said mechanism, causing a step by step motion of said governing means, and means for adjusting the angular position of said actuating member.

EDWARD F. CHANDLER.